United States Patent [19]

Guay

[11] 4,188,208

[45] Feb. 12, 1980

[54] RECOVERY OF GOLD FROM CARBONACEOUS GOLD-BEARING ORES

[75] Inventor: Wilbur J. Guay, Newtown, Conn.

[73] Assignee: Newmont Exploration Limited, Danbury, Conn.

[21] Appl. No.: 972,278

[22] Filed: Dec. 22, 1978

Related U.S. Application Data

[63] Continuation-in-part of Ser. No. 908,166, May 22, 1978, abandoned.

[51] Int. Cl.$^2$ .......................................... C22B 11/08
[52] U.S. Cl. ....................................... 75/105; 75/106; 75/118 R; 423/25; 423/29
[58] Field of Search ................. 75/105, 106, 118 R; 423/25, 29

[56] References Cited

U.S. PATENT DOCUMENTS

| | | | |
|---|---|---|---|
| 1,578,618 | 3/1926 | Welch | 75/105 |
| 2,186,779 | 1/1940 | Crawford | 75/106 X |
| 2,476,420 | 7/1949 | Krebs | 75/118 R |
| 3,846,124 | 11/1974 | Guay | 75/112 |
| 3,920,403 | 11/1975 | Ross | 423/29 X |
| 3,970,737 | 7/1976 | Davidson | 75/118 R X |
| 4,038,362 | 7/1977 | Guay | 423/29 X |

OTHER PUBLICATIONS

Hall, K. B., "Homestake Uses Carbon in Pulp to Recover Gold from Slimes", World Mining, Nov. 1974, pp. 44-49.

Davidson, R. J., "The Mechanism of Gold Adsorption on Activated Charcoal," Journal of the So. African Institute of Mining and Metallurgy, Nov. 1974, pp. 67-76.

*Primary Examiner*—G. Ozaki
*Attorney, Agent, or Firm*—Pennie & Edmonds

[57] ABSTRACT

When certain sedimentary gold ores containing indigenous organic carbonaceous materials are slurried with an aqueous solution containing an alkali metal cyanide, the aurocyanide complex which is formed is adsorbed by an adsorptive carbon component of the ore. Dissolution of the gold proceeds until chemical equilibrium is attained between the aurocyanide complex in solution and the aurocyanide complex adsorbed by the ore. In the process of the invention, the gold is dissolved from the ore by using (1) much higher strengths of cyanide solution, and (2) much higher temperatures than are normally used in the standard cyanidation process, allowing higher extractions of gold to take place. Because the concentration of aurocyanide in solution is limited by chemical equilibrium, the dissolution of gold must be done in stages. An amount of granular activated carbon substantially greater than the amount of indigenous active carbon present in the ore is added to each stage of dissolution, the added carbon and the carbon in the ore both adsorbing the aurocyanide complex until the system comes to equilibrium. The added carbon is separated from the ore slurry after each stage, and the reaction is repeated in successive stages of extraction. The added carbon separated from the ore slurry is treated to remove and recover the gold complexes adsorbed thereon.

8 Claims, 1 Drawing Figure

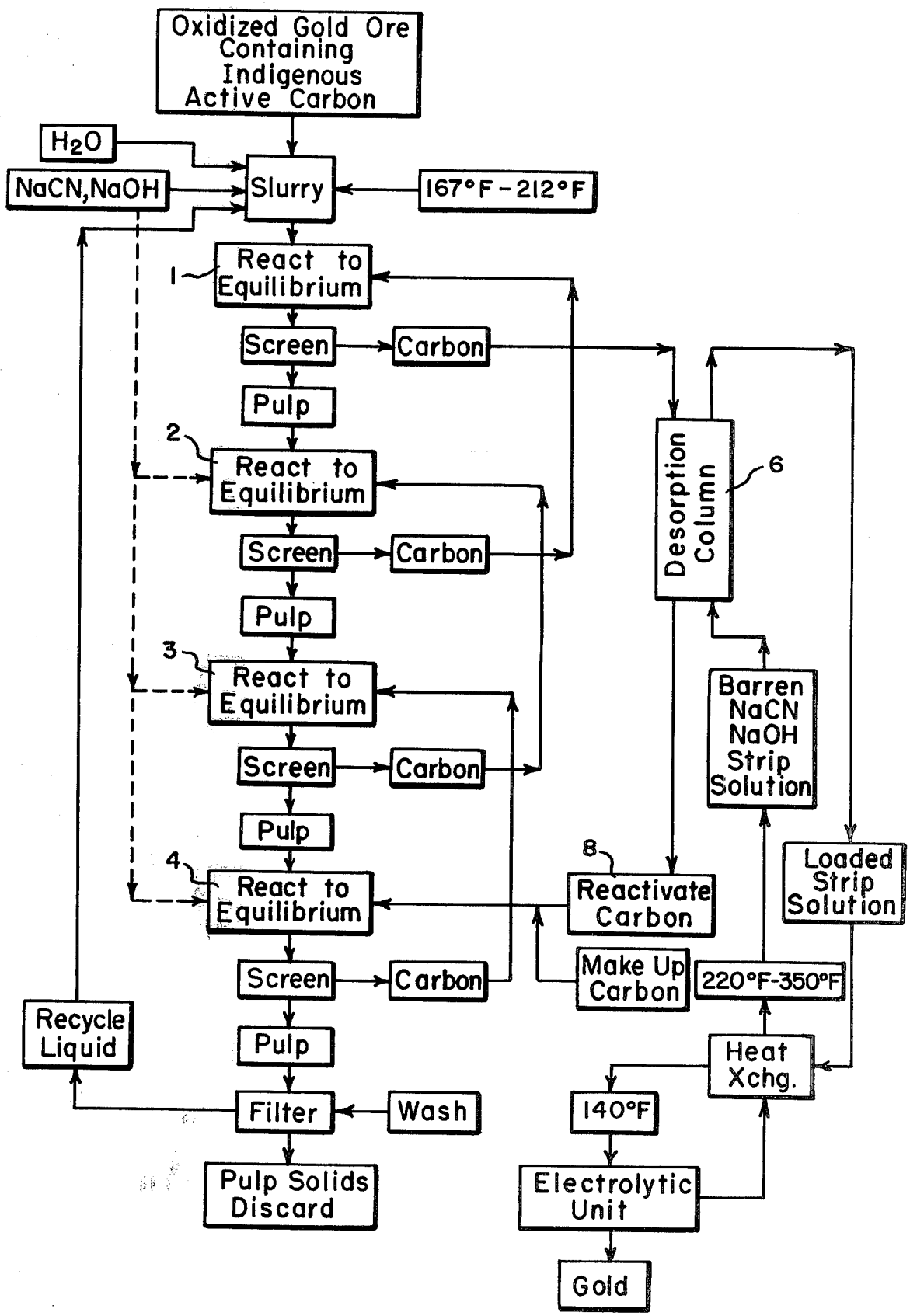

RECOVERY OF GOLD FROM CARBONACEOUS GOLD-BEARING ORES

CROSS-REFERENCE TO RELATED APPLICATION

This application is a continuation-in-part of the application of Wilbur J. Guay Ser. No. 908,166, filed May 22, 1978, now abandoned.

TECHNICAL FIELD

This invention relates to the recovery of gold from gold-bearing ores of sedimentary origin which are characterized by a significant content of organic carbonaceous and sulfidic mineral materials.

BACKGROUND ART

Sedimentary gold-bearing ores containing indigenous organic carbonaceous material and gold bearing sulfidic minerals are notoriously refractory to standard cyanidation treatment for the recovery of their gold content. Investigation into the cause of this problem has indicated that the carbonaceous materials comprises active carbon and long-chain organic compounds. The active carbon appears to adsorb the gold cyanide complex [Au(CN)$_2$—] from cyanide leaching solutions and the long-chain organic compounds appear to form stable complexes with the gold. In addition, some of these ores also contain gold-bearing sulfides. The sulfides contain gold either as a mechanical inclusion, or as atoms of gold included in the sulfide crystal lattice.

In order to overcome this sequestering of the gold and to render the gold component of the ore more amenable to standard cyanidation treatment it has heretofore been proposed that the ore be subjected to a preliminary oxidation treatment to oxidize the carbonaceous, sulfidic mineral materials, and as much of the carbonaceous mineral materials as can be oxidized. In experiments conducted by the United States Bureau of Mines, carbonaceous gold-bearing ores were subjected to a preliminary oxidation with a wide variety of reagents including ozone, sodium hypochlorite, calcium hypochlorite, permanganates, perchlorates, chlorates and oxygen prior to subjecting the oxidized ore to standard cyanidation treatment to extract the gold content therefrom. Of these preliminary oxidation treatments, it was found that the hypochlorites appeared to be the most effective.

In U.S. Pat. No. 3,846,124 to Wilbur J. Guay it was shown that the recoverability, by standard cyanidation, of the gold content of carbon-containing sedimentary gold-bearing ores is increased by subjecting the ore to a preliminary oxidation treatment in which chlorine gas is introduced into an aqueous slurry of the ground ore to the extent that the slurry will adsorb the chlorine, the thus treated slurry being maintained at the chlorination treatment temperature of about 70° to 85° F. for at least 6 hours. The oxidized ore is then subjected to standard cyanidation to extract the gold content therefrom with gold recoveries in the order of 75% or more of the gold content of the ore.

In U.S. Pat. No. 4,038,362 to Wilbur J. Guay it was shown that the recoverability, by standard cyanidation, of the gold content of sedimentary gold-bearing ores containing organic carbonaceous material and gold-bearing pyrite, or other gold-bearing sulfides, is increased and the cost of the pretreatment greatly reduced by subjecting the ore to a two-stage preliminary oxidation treatment. In this process an aqueous slurry of the ore is first heated to about 167° to 212° F., and air or oxygen is then introduced into the heated slurry to oxidize and eliminate a substantial portion of the carbonaceous material and oxidizable sulfides in the slurried ore. The slurry is then cooled to about 70° to 85° F., and chlorine gas is introduced into the slurry to substantially complete the oxidation and chlorination of the carbonaceous content of the slurried ore. The oxidized ore is then subjected to conventional cyanidation to recover the gold content thereof.

Conventional cyanidation practice involves leaching the finely divided gold-bearing ore at ambient temperatures with an aqueous solution containing from about 0.01 to 0.1 percent by weight of an alkali metal cyanide and, usually, a lesser amount of an alkali metal hydroxide to form a water soluble aurocyanide complex. However, the sedimentary gold-bearing ores with which the present invention is concerned contain a small but significant amount of elemental carbon that is not oxidized by the preliminary oxidation treatment of the ore and that tends to adsorb a portion, and with some ores a major portion, of the aurocyanide complex that is produced in the course of the cyanidation treatment, the adsorbed gold complex being discarded with the ore tailings following the cyanidation treatment.

It is known that the aurocyanide complex can be desorbed from manufactured activated carbon with cyanide solutions containing much higher strengths of cyanide (in the order of from 0.1 to 1.0 percent by weight alkali metal cyanide and from 0.1 to 10 percent by weight alkali metal hydroxide) at substantially higher temperatures than are usually used in the standard gold cyanidation process. I have now made the surprising discovery that the gold content of ores containing adsorptive carbon can be leached and recovered therefrom at the high cyanide strengths used for desorbing gold from manufactured activated carbon at temperatures from about 167° to 212° F. Under these conditions, the gold content of the ore will dissolve and the resulting aurocyanide complex will be adsorbed by the adsorptive carbon component of the ore until chemical and physical equilibrium are reached between the gold content of the ore, the aurocyanide complex in solution and the aurocyanide complex adsorbed on the adsorptive carbon component of the ore. The alkali cyanide and the aurocyanide complex are protected from decomposition at these temperatures by maintaining much more strongly alkaline conditions than are used in standard cyanidation of gold ores. After reaching or nearly reaching chemical equilibrium, the solution can be separated from the ore and the reaction repeated with fresh cyanide solution containing no gold until the gold which is dissolved from the ore in the second cyanide treatment again approaches equilibrium with the adsorbed gold. The procedure can be repeated as many times as necessary in order to get the desired recovery of gold from the ore. Alternatively, particles of activated carbon can be introduced into each stage of gold dissolution. At the end of each stage, equilibrium is reached or nearly reached between the gold in solution, the gold adsorbed on the added particles of activated carbon, and the gold adsorbed by the adsorptive carbon component of the ore. The added particles of activated carbon can be separated from the aqueous ore slurry by passing the slurry over a vibrating sieve which retains the carbon particles while allowing the ore slurry to pass therethrough. The carbon particles are then treated to recover the aurocyanide complex which has been adsorbed on the surfaces thereof.

Gold ores containing very adsorptive carbonaceous materials, ores from which little or no gold can be recovered by ordinary methods of cyanidation due to the adsorption of the aurocyanide complexes on the carbon component of the ore, have shown recoveries of from 80 to 90% of the gold content of the ore after only four stages of treatment with the strong cyanide solutions employed in the practice of the present invention. These recoveries have been achieved by both of the procedures just described—namely, separation of the gold bearing solutions from the ore after each dissolution stage, or adsorption of the aurocyanide complex on granular activated carbon added to the slurry of ore and cyanide solution during each dissolution stage followed by removal of the added carbon granules and recovery of the gold adsorbed thereon. Moreover, using these new procedures instead of chlorination of the ore followed by standard cyanidation results in significantly improved process economics, particularly with ores that consume large amounts of chlorine per ton of ore treated.

DISCLOSURE OF INVENTION

The sedimentary gold-bearing ores are advantageously first subjected to a preliminary oxidation treatment with air or oxygen to oxidize substantially all of the sulfidic mineral materials and as much of the carbonaceous materials contained therein as can be oxidized. Although this preliminary treatment is necessary with some ores, it is covered by a previous patent and is not part of the present invention.

In the preferred practice of the invention, the oxidized ore is subjected to a combined cyanidation and adsorption treatment by (a) forming an aqueous pulp of the oxidized ore, (b) adding an alkali metal cyanide and an alkali metal hydroxide to the aqueous pulp to react with and convert the gold content of the oxidized ore to water soluble auric cyanide complexes, (c) adding granular activated carbon to the aqueous pulp to adsorb said auric cyanide complexes on the surface of said granules, and (d) agitating the aqueous pulp to promote the cyanidation reaction by the ore and the solution until chemical equilibrium is approached between the aurocyanide complex in solution and the aurocyanide complex adsorbed on both the activated carbon and the adsorptive carbon component of the ore. The amount of alkali metal cyanide and alkali metal hydroxide added to the aqueous pulp is advantageously such that the pulp contains from about 0.1 to 10% by weight of alkali metal hydroxide and from about 0.1 to 1% by weight of alkali metal cyanide, the temperature of the aqueous pulp being maintained at about 167° to 212° F. throughout the cyanidation treatment. Upon completion of the combined cyanidation and adsorption treatment the particles of activated carbon on the surface of which the aurocyanide complex has been adsorbed are separated from the aqueous pulp containing the oxidized ore from which these gold compounds have been extracted. The particles of activated carbon are then treated to strip the aurocyanide complex from the surface thereof, the said gold complexes being recovered and treated to convert the gold content thereof to metallic gold.

The combined cyanidation and adsorption treatment is advantageously carried out in a series of batch-like steps wherein the aqueous pulp containing the oxidized gold-bearing ore is initially introduced into the first of a plurality of serially arranged agitator tanks where the pulp is brought into contact for a predetermined period of time with particles of activated carbon contained therein, the pulp then being transferred successively to each of the succeeding tanks in said plurality of serially arranged tanks and finally to the last agitator tank in said series of tanks, and wherein particles of activated carbon essentially free of adsorbed gold complexes are initially introduced into said last agitator tank in said series of tanks where the activated carbon is brought into contact for said predetermined period of time with the aqueous pulp contained therein, the particles of activated carbon then being transferred successively to each of the preceding tanks in said plurality of serially arranged tanks and finally to the first agitator tank in said series of tanks; whereby the gold content of the oxidized gold-bearing ore is progressively depleted as the pulp proceeds through the first to the last of the plurality of serially arranged agitator tanks and the amount of the aurocyanide complex adsorbed on the surface of the particles of activated carbon is progressively increased as the carbon particles proceed through the last to the first agitator tank in said series of tanks generally countercurrent to the movement of the aqueous pulp therethrough.

BRIEF DESCRIPTION OF THE DRAWING

The process of the invention will be better understood from the following detailed description thereof in conjunction with the accompanying drawing which depicts in schematic form an advantageous embodiment of the process.

BEST MODE FOR CARRYING OUT THE INVENTION

The sedimentary gold-bearing ore to which the present invention relates typically contains from about 0.1 to 1.0 ounces of gold per ton of ore, from about 0.1 to 5.0% by weight of carbon and up to about 2.0% by weight of pyritic materials, a substantial portion of the gold being present in the form of organic carbonaceous compounds and gold-bearing mineral sulfide materials. The ore is prepared for treatment pursuant to the invention by wet grinding the crushed ore to about 60 weight percent minus 200 mesh (Tyler Standard Screen) with sufficient water so that it will form a slurry with about 40 to 50% solids in water. Preferably, no extraneous components are used in forming this slurry, including extraneous alkaline material, so that it will have a pH ranging between 6 and 10 resulting solely from the slurrying of only the ore with water. The resulting slurry is heated to a temperature within the range of 167° to 212° F. by conventional means.

Air, or oxygen, is then dispersed through the heated slurry, advantageously by bubbling it into the bottom of the slurry mass by any conventional and appropriate device at a rate such that it will be present in excess of the amount required for the reaction with the carbonaceous compound and gold-bearing sulfides. Generally, this bubbling of the air or oxygen into the slurry will be accompanied by sufficient agitation to insure uniform exposure of the ore to the action of the air, or oxygen. The reaction between the oxygen and the carbonaceous components of the ore results in the evolution of carbon dioxide, nitrogen and excess oxygen from the slurried ore. The reaction between oxygen and the gold-bearing sulfides results in chemical compounds that remain in the slurry. The bubbling is continued for a period of from 8 to 24 hours or until no further oxidation of carbonaceous compounds or gold-bearing sulfides by air, or oxygen, is being effected.

The preliminary oxidation treatment oxidizes the organic carbonaceous compounds and the sulfidic mineral materials present in the ore and thereby renders the gold content of the ore amenable to extraction by cyanidation. However, as previously noted the presence of indigenous active carbon in the ore prevents as complete a recovery of the gold content of the ore as is desired. Pursuant to the practice of the invention the oxidized ore is subjected to a combined cyanidation and adsorption treatment wherein an alkali metal cyanide and an alkali metal hydroxide are added to an aqueous pulp containing the ore in order to convert the gold content of the ore to a water soluble aurocyanide complex, particles of granular activated carbon also being added to the aqueous pulp to adsorb most of the aurocyanide complex essentially as soon as it is produced by the cyanidation reaction. Upon completion of the cyanidation and adsorption treatment the particles of extraneous activated carbon on the surface of which a major portion of the aurocyanide complex has been adsorbed are separated from the cyanidation reaction mixture by flowing the ore pulp over a vibrating sieve which removes the particles of activated carbon, and the adsorbed aurocyanide complex is then stripped from the surface of the active carbon and is treated to recover the gold content thereof in metallic form.

More specifically, the oxidized ore from the preliminary oxidation treatment containing, for example, about 0.3 to 0.4 ounce of gold per ton of ore is advantageously filtered and then repulped with water to form an aqueous pulp containing from about 40 to 50% by weight solids, the pulp then being heated to a temperature within the range of from about 167° to 212° F. at which temperature it is maintained throughout the cyanidation and adsorption treatment of the ore. Sodium hydroxide and sodium cyanide, or potassium hydroxide and potassium cyanide, are added to the aqueous pulp in amounts such that the pulp contains from about 0.1 to 10% by weight of the alkali metal hydroxide and from about 0.1 to 1.0% by weight of the alkali metal cyanide. In addition, up to about 10% by weight of sodium carbonate or potassium carbonate may also be added to the pulp. Particles of granular activated carbon having a particle size of between about 6 to 16 mesh (Tyler Standard) are added to the cyanidation reaction mixture in an amount such that there are between about 10 to 20 grams of active carbon per liter of aqueous pulp. The cyanidation reaction mixture and the active carbon are agitated to promote the cyanidation reaction and the concurrent adsorption of the aurocyanide complex produced thereby on the surface of the active carbon particles, the combined cyanidation and adsorption treatment being continued for a sufficient time to insure the maximum feasible cyanidation and adsorption of the gold content of the ore, or until the reaction between the gold content of the ore and the cyanidation solution and the adsorption of the resulting aurocyanide complex on the indigenous adsorptive carbon content of the ore and on added particles of activated carbon approach chemical and physical equilibrium.

In the preferred practice of the invention the cyanidation and adsorption treatment is carried out in a series of batch-like steps wherein the aqueous pulp containing the oxidized gold-bearing ore is caused to travel through a plurality of serially arranged agitator tanks countercurrent to the travel of the particles of activated carbon through the series of tanks. Thus, as shown in the accompanying schematic drawing of the process, the aqueous pulp containing the oxidized gold-bearing ore and the cyanidation reagents is initially introduced into the first agitator tank 1 of a plurality of serially arranged agitator tanks where the pulp is brought into contact with particles of granular activated carbon for a predetermined period of time that is sufficient to allow the amount of aurocyanide complex in the pulp and the amount adsorbed on the granules of activated carbon to approach chemical and physical equilibrium. The pulp is then transferred successively to each of the succeeding tanks 2 and 3 and finally to the last agitator tank 4 in the series of serially arranged tanks where the pulp is brought into contact with other particles of granular activated carbon contained in each of the said tanks. Particles of granular activated carbon essentially free of adsorbed auric gold complexes are initially introduced into the last agitator tank 4 in said series of tanks where the activated carbon is brought into contact for the aforesaid predetermined period of time with the aqueous pulp contained therein. The particles of activated carbon are then separated from the aqueous pulp by means of a screen or the like and are transferred successively to each of the preceding tanks 3 and 2 in the plurality of serially arranged tanks and finally to the first agitator tank 1 in said series of tanks. As a result, the gold content of the oxidized gold-bearing ore is progressively depleted as the pulp proceeds through the first to the last of the plurality of serially arranged agitator tanks and the amount of the aurocyanide complex adsorbed on the surface of the particles of activated carbon is progressively increased as the carbon particles proceed through the last to the first agitator tank in said series of tanks generally countercurrent to the movement of the aqueous pulp therethrough.

As noted, the heated aqueous pulp containing the oxidized ore and the cyanidation reagents is transferred from one agitator tank to the next succeeding agitator tank in the series of said tanks after being retained in each tank in contact with the particles of active carbon also contained therein for a predetermined period of time. The average residence time of the aqueous pulp in each tank is the total time required to obtain the maximum feasible extraction and adsorption of the gold content of the ore divided by the number of tanks employed in the process, and I have found this time to be from about 2 to 12 hours per tank depending on the conditions prevailing within the tanks for the chemical and physical reactions being carried out therein and on the length of time required for these reactions to approach chemical and physical equilibrium. The aqueous pulp may be transferred from one tank to the next succeeding tank either periodically or more or less continuously, and if periodically the amount transferred may comprise the entire contents of the tank or some predetermined fraction thereof. In any case, whenever an amount of the aqueous pulp is transferred from the first tank 1 to the second tank 2 a like amount of fresh aqueous pulp containing the oxidized gold-bearing ore is introduced into the first agitator tank to replace the pulp removed therefrom. In addition, whenever the aqueous pulp is transferred from one tank to the next tank in the series of tanks, additional alkali metal cyanide and/or alkali metal hydroxide may be added to the pulp to maintain the concentration of these reagents at the desired level, as indicated by the dashed line in the drawing. The aqueous pulp removed from the last agitator tank in the series of tanks is filtered and the filter cake comprising the ore depleted in its gold content is discarded. The filtrate and wash water is advantageously recycled to the beginning of the cyanidation and adsorption treatment of the oxidized ore.

As also previously mentioned, the particles of granular activated carbon are transferred from one agitator tank to the next preceding agitator tank in the series of said tanks after being retained in each tank for a predetermined period of time. The active carbon may be transferred from one tank to the next preceding tank either periodically or more or less continuously, and if periodically the amount transferred may comprise either the entire contents of the tank or some predetermined fraction thereof. In any case, when ever an amount of the active carbon is transferred from the last tank 4 to the next-to-the-last tank 3 a like amount of fresh active carbon having at most an insignificant amount of auro cyanide complexes adsorbed thereon is introduced into the last agitator tank to replace the active carbon removed therefrom.

The particles of active carbon removed from the first agitator tank in the series of tanks are treated to remove the adsorbed aurocyanide complexes therefrom advantageously by introducing the carbon particles into a desorption column 6 where they are brought into intimate contact with an aqueous strip solution containing from about 0.1 to 10% by weight of sodium hydroxide or potassium hydroxide, from about 0.1 to 1.0% by weight of the corresponding alkali metal cyanide and, optionally, up to about 10% by weight of alkali metal carbonate. The caustic strip solution is heated to a temperature of from about 220° to 350° F. and is maintained in contact with the active carbon for a period of time sufficient to dissolve the adsorbed aurocyanide complexes in the strip solution. The flow of strip solution through the desorption column 6 is generally countercurrent to the movement of carbon particles therethrough, and the desorption operation can advantageously be carried in a plurality of serially arranged desorption columns or tanks in the manner known in the art. Upon completion of the desorption operation the particles of activated carbon having all but a relatively insignificant amount of aurocyanide complexes stripped therefrom are removed from the desorption column 6 and are recycled to the last agitator tank 4 of the series of said tanks. Preferably, however, the particles of active carbon are first subjected to a reactivation treatment prior to being introduced into the last agitator tank by heating the particles to a temperature in the order of about 500° F. in the absence of air in a suitable reactivation furnace or oven 8.

The loaded strip solution containing the aurocyanide complexes removed from the active carbon is advantageously employed to preheat the barred strip solution as indicated in the schematic drawing. The cooled strip solution containing the auric cyanide complexes is then treated to recover the gold content thereof, advantageously by means of such well known electrolytic procedures as that described in U.S. Bureau of Mines Report of Investigation 4843 (1952). A substantially pure metallic gold product is recovered representing up to about 90% of the gold content of the original gold-bearing ore. The barren strip solution is reheated to the desired aurocyanide stripping temperature and is recycled to the desorption column 6 as also indicated in the schematic drawing.

The stripping solution is similar in composition to the leaching solution. Stripping can be done countercurrently in columns. The entering solution containing no gold reacts with the aurocyanide loaded carbon until equilibrium is approached, at which time the reaction stops. By flowing the solution countercurrent to the carbon, the solution leaving the system will be at its maximum loading while the carbon leaving the other end of the system will be at the lowest possible loading of gold. If the same temperature is used in stripping that was used in leaching the gold from the ore, the stripping solution will have approximately the same concentration of gold that it had in the first cyanide dissolution tank. However, if higher temperatures are used, the stripping liquor will have a higher concentration of gold.

The adsorption of gold from solution by both the active carbon component in the ore and the added activated carbon under the same conditions that are used for desorption of gold from activated carbon can be explained on the basis of the principles of chemical equilibrium and the reversibility of adsorption and desorption of the aurocyanide complex by activated carbon. In desorption of the aurocyanide complex from activated carbon, strip solutions containing less than 0.01 ounces of gold per ton are caused to flow through a column of activated carbon which may be loaded to a concentration of 100 ounces or more of gold per ton of carbon. The solution dissolves the aurocyanide complex until chemical equilibrium is reached between the aurocyanide in solution and that adsorbed on the carbon surfaces. Thus, the maximum concentration of gold in solution is limited by chemical equilibrium. The initial effluent from the carbon column may contain several ounces of gold per ton of solution. As desorption continues, the equilibrium concentration of gold in the effluent solution may contain less than 0.1 ounce of gold per ton of solution and the carbon as little as 2 ounces of gold per ton of carbon. Because of chemical equilibrium, desorption cannot be 100% complete.

In the process of the invention, the procedure is reversed. As soon as the leaching solution begins to dissolve gold from the ore, some of the gold is adsorbed by the active carbon component of the ore. As leaching progresses, the solution and the active carbon both increase in gold content until equilibrium is reached, at which time the reaction stops. Thus, the concentration of gold in solution and the concentration of gold on the carbon surfaces in the ore are similar to the concentrations which prevail in solution and on the carbon surfaces near the end of the desorption of gold from manufactured activated carbon. With desorption, equilibrium is approached beginning with high concentrations of gold on the carbon and very low concentrations of gold in solution. When leaching gold from and ore using the same concentration of alkali metal cyanide and strong base and at the same temperature, equilibrium is approached from the opposite direction beginning with higher concentrations of gold in solution and very low concentrations of gold on the added carbon and the carbon in the ore. In both cases the reaction approaches equilibrium.

The following examples are illustrative but not limitative of the practice of the invention.

EXAMPLE I

A random mass of organic carbon-containing sedimentary gold-bearing ore from Carlin, Nev., which contains about 0.3 ounce of gold per ton, about 1 percent pyrite ($FeS_2$), and from from 0.9 to 4.3% total carbon (about 0.3 to 0.7% carbon in the organic form), is crushed to minus 10 mesh (Tyler) and then is wet ground with water (60 wt. percent ore, 40% water, by weight) to yield an aqueous slurry containing the ore in approximately 60% minus 200 mesh particle size. The ground ore slurry or pulp is then transferred to an open vessel where it is continuously stirred while water is added so as to adjust the pulp to between 40 and 50% by weight of solids. The slurry is heated to within the range of about 200° to 210° F. and is maintained at this temperature for 8 hours. Oxygen is bubbled through the heated slurry at the rate of 0.1 liters per minute (STP) for 8 hours with the concomitant evolution of carbon dioxide, nitrogen and excess oxygen from the slurry, indicating that a substantial portion of the organic carbonaceous components of the ore is being oxidized and eliminated from the slurry.

The slurry is filtered and the filter cake comprising the oxidized ore containing about 0.3 ounce of gold per ton of ore is mixed with water, or with recycled pulp solution as hereinafter described, to form an aqueous pulp containing 45% by weight of solids. Sufficient sodium hydroxide and sodium cyanide is added to the pulp so that the pulp contains 1.0% NaOH and 0.2% NaCN. The aqueous pulp containing the cyanidation reagents is heated to a temperature of about 190° F. and is then subjected to the combined cyanidation and adsorption treatment of the process in the manner previously described. That is to say, the aqueous pulp containing the oxidized gold bearing ore and the cyanidation reagents is introduced into the first agitator tank 1 of a series of four agitator tanks, where it is brought into contact with particles of activated carbon for a predetermined period of time, the pulp then being transferred successively to each of the succeeding tanks 2 and 3 finally to the last agitator tank 4 of the series of tanks before being discharged from the system. Similarly, particles of granular activated carbon having a particle size of minus 6 to plus 16 mesh (Tyler Standard) are introduced into the last agitator tank 4 where the activated carbon is brought into contact with the aqueous pulp contained therein, the particles of activated carbon then being transferred successively to each of the preceding tanks 3 and 2 and finally to the first agitator tank 1 in the series of tanks before being removed from the system by a vibrating sieve for recovery of the gold compounds adsorbed thereon.

The aqueous pulp travels through the system of tanks at an overall rate of about 500 tons of ore solids per day, and the average retention time of the aqueous pulp in each of the agitator tanks is about 4 hours per tank. The pulp introduced into the first agitator tank 1 contains an average of 0.3 ounce of gold per ton of ore solids, the pulp transferred from the first tank 1 to the second tank 2 contains an average of 0.19 ounce of gold per ton of pulp solids and 0.036 oz./ton in the pulp solution, the pulp transferred from the second agitator tank 2 to the third tank 3 contains an average of 0.135 ounce of gold per ton of pulp solids and 0.023 oz./ton in the pulp solution, the pulp transferred from the third agitator tank 3 to the fourth tank 4 contains 0.075 ounce of gold per ton of pulp solids and 0.007 oz./ton in the pulp solution, and the pulp removed from the fourth agitator tank 4 contains an average of 0.045 ounce of gold per ton of pulp solids and 0.003 oz./ton in the pulp solution. The aqueous pulp removed from the fourth agitator tank 4 is filtered and the filter cake advantageously is washed with water. The washed ore solids containing an average of 0.045 ounce of gold per ton of solids is discarded, and the filtrate is advantageously recycled to the beginning of the cyanidation/adsorption treatment of the oxidized ore.

The particles of activated carbon travel through the system of tanks at an overall rate of about 9.1 tons of carbon per day, there being about 36 pounds of active carbon per ton of ore solids in the mixture of pulp and carbon particles in each tank of the system. The particles of active carbon introduced into the fourth agitator tank 4 have an average of 1.0 ounce of gold per ton of carbon adsorbed thereon, the active carbon transferred from the fourth tank 4 to the third tank 3 has an average of 3.1 ounces of gold per ton of carbon adsorbed thereon, the activated carbon transferred from the third agitator tank 3 to the second tank 2 has an average of 7.5 ounces of gold per ton of carbon adsorbed thereon, the activated carbon transferred from the second agitator tank 2 to the first tank 1 has an average of 11.4 ounces of gold per ton of carbon adsorbed thereon, and the activated carbon removed from the first agitator tank for delivery to the stripping unit has an average of 15 ounces of gold per ton of carbon adsorbed thereon.

The activated carbon from the first agitator tank is introduced into a carbon desorption tank where it is brought into intimate contact with a caustic cyanide stripping solution at a temperature of about 300° F. for a period of about 4 hours. The caustic cyanide stripping solution initially contains 1.0% by weight NaOH, 0.2% by weight NaCN and not more than about 0.3 ounce of gold per ton of solution, and the loaded stripping solution removed from the desorption tank upon completion of the stripping operation contains about 1.0 ounce of gold per ton of solution. The activated carbon introduced into the desorption tank initially has about 15 ounces of gold per ton of carbon adsorbed thereon, and the activated carbon removed from the desorption tank upon completion of the stripping operation has about 1.0 ounce of gold per ton of carbon adsorbed thereon. The activated carbon is heated to a temperature of about 500° F. in a non-oxidizing atmosphere to reactivate the carbon, and the particles of reactivated carbon together with any additional activated carbon required to make up for losses, is introduced into the fourth agitator tank 4 as shown in the drawing.

The hot caustic cyanide stripping solution withdrawn from the desorption tank is cooled to about 140° F., and the solution is subjected to electrolysis to electrolytically deposit the gold content thereof on a cathode made of steel wool. 127.5 ounces of gold per day are recovered, representing 85% of the gold content of the original ore. As noted, the caustic cyanide stripping solution withdrawn from the desorption tank contains about 1.0 ounce of gold per ton of solution, and the barren stripping solution obtained as a result of the electrolytic operation contains 0.3 ounce of gold per ton of solution. The barren stripping solution is reheated to a temperature of 300° F. and is recycled to the carbon desorption tank as also shown in the drawing.

EXAMPLE II

The same sedimentary gold bearing ore as that employed in Example I is oxidized and the oxidized ore is subjected to a combined cyanidation and adsorption treatment in the same manner and under the same conditions as are described in Example I with the exception that the cyanidation reaction liquor contains 10% by weight KOH, 0.2% by weight KCN and 5% by weight $K_2CO_3$. Essentially the same results are obtained as are obtained in Example I.

I claim:

1. In the process for the recovery of gold from sedimentary gold-bearing ores containing indigenous organic carbonaceous material a component of which is capable of adsorbing aurocyanide complexes from an aqueous solution, wherein an aqueous slurry of the ore is advantageously subjected to a preliminary oxidation treatment to oxidize as much of the organic carbonaceous material contained therein as possible, the improvement which comprises:

subjecting the oxidized ore to a combined cyanidation and adsorption treatment by (a) forming an aqueous pulp by the oxidized ore, (b) heating the aqueous pulp to a temperature of between about 167° and 212° F., (c) adding an alkali metal cyanide and alkali metal hydroxide to the aqueous pulp to react with it and convert the gold content of the oxidized ore to a water soluble aurocyanide complex, the amount of alkali metal cyanide and alkali metal hydroxide added to the aqueous pulp being such that the pulp contains from about 0.1 to 1.0% by weight of alkali metal cyanide and from about 0.1 to 10% by weight of alkali metal hydroxide, (d) adding particles of granular activated carbon to the aqueous pulp to adsorb a major portion of the aurocyanide complex on the surface of said particles, and (e) agitating the aqueous pulp to promote the cyanidation reaction and the concurrent adsorption of the aurocyanide complex produced thereby for a period of time sufficient to allow these processes to approach chemical and physical equilibrium;

separating the particles of granular activated carbon on the surface of which said aurocyanide complex has been adsorbed from the aqueous pulp containing the oxidized ore from which said gold compounds have been extracted;

subjecting said particles of activated carbon to an aurocyanide complex desorption treatment to strip the aurocyanide complex from the surface of the activated carbon; and recovering said aurocyanide complex and converting the gold content thereof to metallic gold.

2. The process according to claim 1 in which the aqueous pulp contains from about 0 to 10% by weight of alkali metal carbonate.

3. The process according to claim 1 in which the aqueous pulp contains about 1% by weight sodium hydroxide and about 0.2% by weight sodium cyanide.

4. The process according to claim 1 in which aqueous pulp contains about 10% by weight potassium hydroxide, about 0.2% by weight potassium cyanide and about 5% by weight potassium carbonate.

5. The process according to claim 1 in which the particles of granular activated carbon are separated from the aqueous pulp by means of a vibrating sieve that retains the granular carbon particles while allowing the aqueous pulp to pass therethrough.

6. The process according to claim 1 in which the combined cyanidation and adsorption treatment is carried out in a series of batch-like steps wherein the aqueous pulp containing the oxidized gold-bearing ore is initially introduced into the first of a plurality of serially arranged agitator tanks where the pulp is brought into contact for a predetermined period of time with particles of granular activated carbon contained therein, the pulp then being transferred successively to each of the succeeding tanks in said plurality of serially arranged tanks and finally to the last agitator tanks in said series of tanks, and wherein particles of granular activated carbon essentially free of adsorbed aurocomplex are initially introduced into said last agitator tank in said series of tanks where the activated carbon is brought into contact for said predetermined period of time with the aqueous pulp contained therein, the particles of activated carbon then being transferred successively to each of the preceding tanks in said plurality of serially arranged tanks and finally to the first agitator tank in said series of tanks; whereby the gold content of the oxidized gold-bearing ore is progressively depleted as the pulp proceeds through the first to the last of the plurality of serially arranged agitator tanks and the amount of aurocyanide complexes adsorbed on the surface of the particles of activated carbon is progressively increased as the carbon particles proceed through the last to the first agitator tank in said series of tanks generally countercurrent to the movement of the aqueous pulp therethrough.

7. The process according to claim 1 in which the aurocyanide complex adsorbed on the surface of the particles of activated carbon separated from the aqueous pulp upon completion of the cyanidation and adsorption treatment are desorbed by contacting the particles of activated carbon with a stripping solution containing from about 0.1 to 10% by weight of alkali metal hydroxide and from about 0.1 to 1% by weight of alkali metal cyanide at a temperature of between about 220° to 350° F. for a sufficient period of time to affect the substantially complete removal of said gold complexes from the surface of the particles of activated carbon.

8. The process according to claim 1 in which the particles of granular activated carbon from which the aurocyanide complex has been removed are heated to a temperature of at least about 500° F. in a non-oxidizing atmosphere to reactivate the carbon particles, and in which the reactivated carbon particles are recycled through the cyanidation and adsorption treatment steps of the process.

* * * * *